Nov. 6, 1928.
F. M. CASE
1,690,401
FISHING REEL
Filed March 31, 1923
2 Sheets-Sheet 1
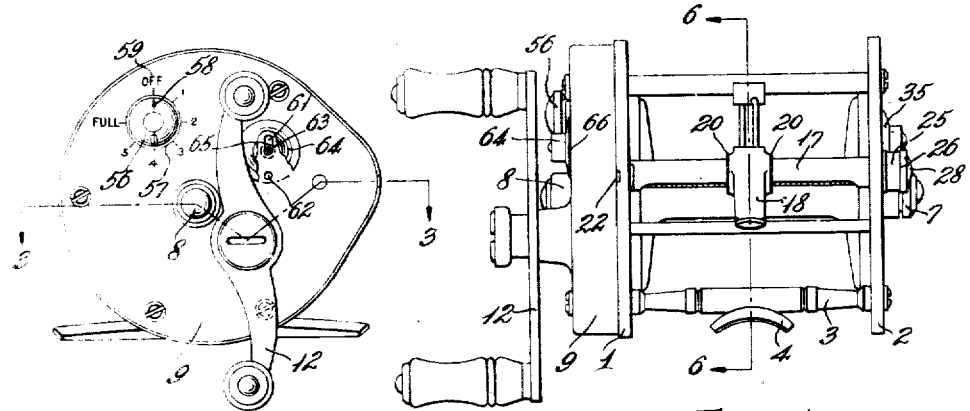
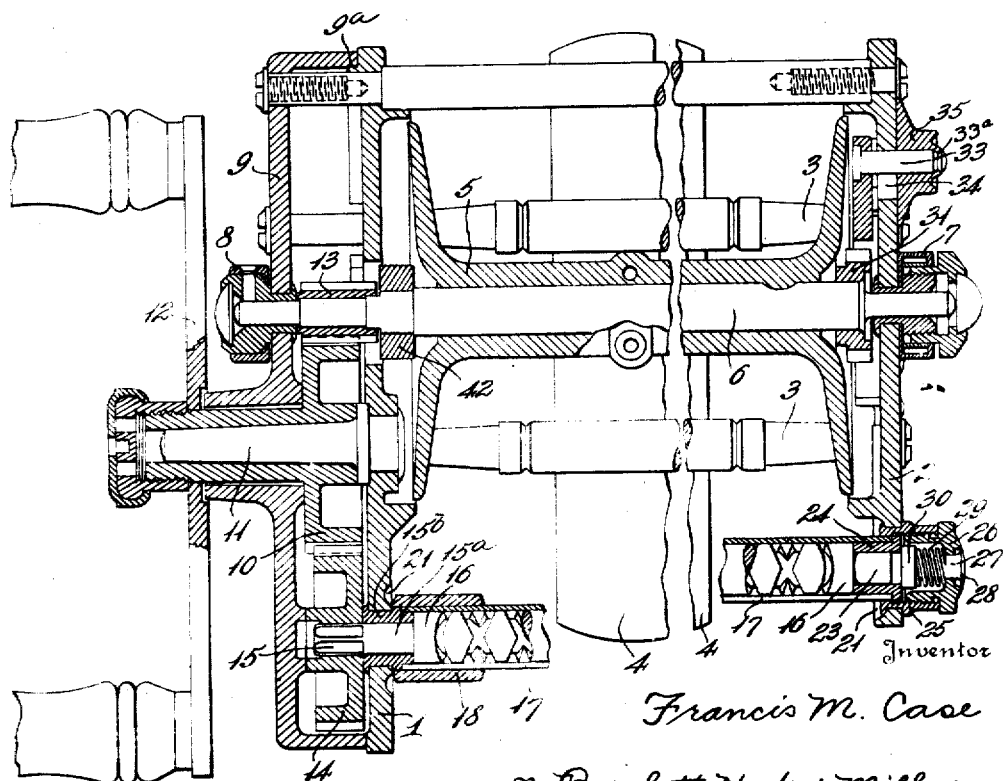
Inventor
Francis M. Case
By Brockett, Hyde & Milburn
Attorneys

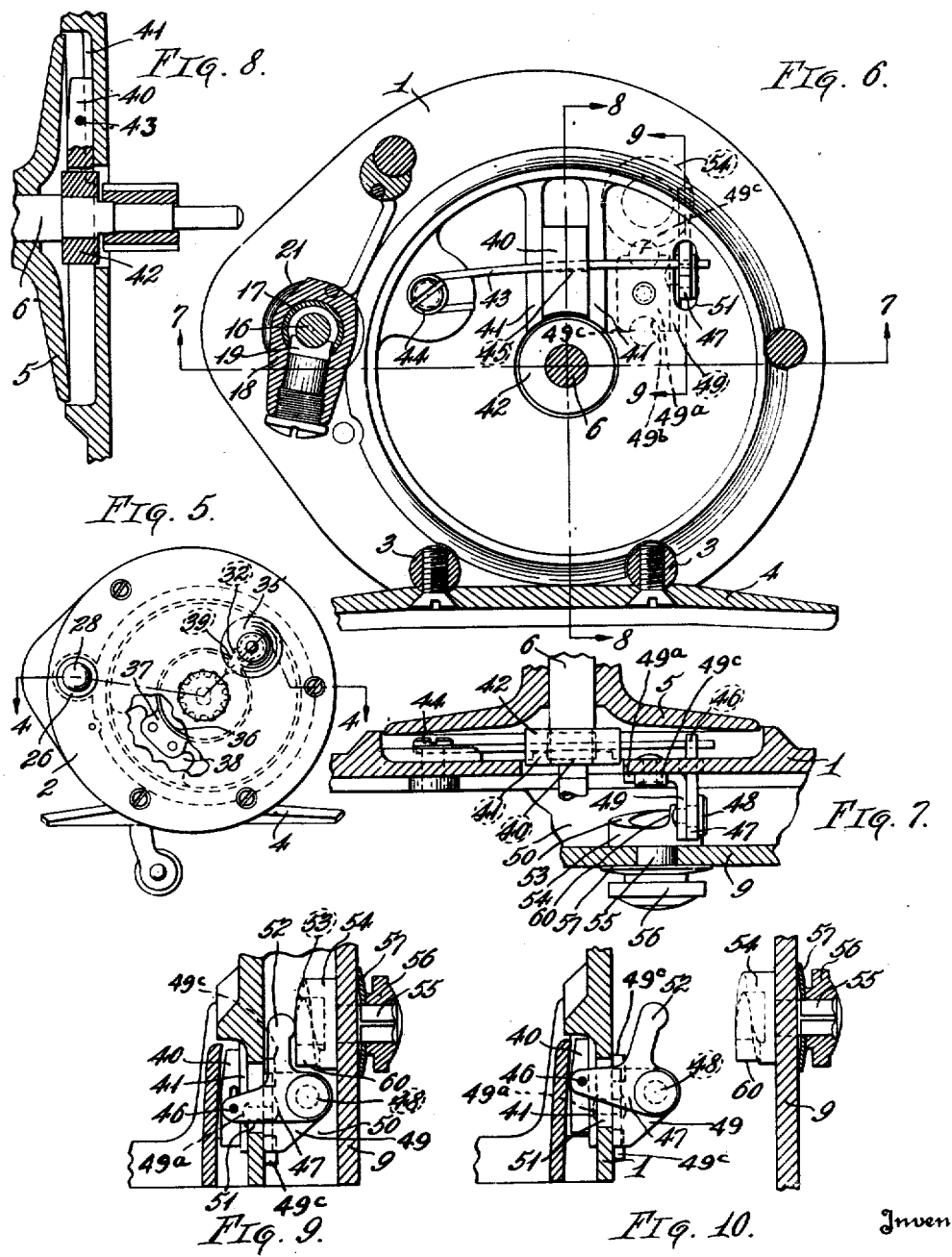

Patented Nov. 6, 1928.

1,690,401

UNITED STATES PATENT OFFICE.

FRANCIS M. CASE, OF CLEVELAND, OHIO, ASSIGNOR TO THE ENTERPRISE MANUFACTURING COMPANY, OF AKRON, OHIO, A CORPORATION OF OHIO.

FISHING REEL.

Application filed March 31, 1923. Serial No. 629,040.

This invention relates to fishing reels, and more particularly to level wind anti-backlash reels embodying all the necessary features of reels of this class, such as level winding mechanism for laying the line evenly on the spool, anti-blacklash mechanism for preventing over-running of the spool in casting and consequent entangling of the line, click mechanism for spool retarding purposes, and the necessary driving and operating mechanism, all of these several features being of improved form and co-ordinated or organized in a single mechanism capable of convenient operation and delicate control and readily assembled, disassembled or otherwise manipulated, and the parts of which are of the proper form for inexpensive quantity production and are durable in use and not likely to get out of order in service.

More specifically, one object of the invention is to improve the anti-back lash mechanism, the operating parts of which are so arranged as to be disconnected or separated with the braking element in off position and out of the way without special attention by the operator when the reel is disassembled, but in which disassembly of the reel will not injure the delicate parts, such as the spring and the drag or brake member.

Another object of the invention is the provision of a relatively small and therefore more sensitive braking drum and the use of a flexible operating arm for the braking element, said arm being arranged to hold the brake either on or off and with yielding effect under both conditions.

Another object of the invention is to improve the details of construction of the braking parts and to provide a brake indicator arranged to indicate the different amounts of braking effect and to afford such indication not only by means perceptible to the eye, but also by means perceptible to the sense of touch, so that it will be readable in the dark as well as in the light.

A further object of the invention is to improve the casing or frame of the reel to enable it to be more readily disassembled and to also provide recesses in the end plates to receive the travelling line guide and thereby prevent pinching of the line at the ends of travel of said guide.

Further objects of the invention are in part obvious and in part will appear more in detail hereinafter.

In the drawings, Fig. 1 is a front elevation of a reel embodying the invention; Fig. 2 is an end view from the left in Fig. 1; Fig. 3 is a sectional plan view on approximately the line 3—3, Fig. 2, the handle 12 being in a different position in Fig. 3; Fig. 4 is a similar view on approximately the line 4—4, Fig. 5; Fig. 5 is an end view from the right in Fig. 1, part of the end plate being broken out to expose interior parts; Fig. 6 is a sectional elevation, on a larger scale, on the line 6—6, Fig. 1, the spool being omitted; Fig. 7 is a detail sectional plan view from beneath, on the line 7—7, Fig. 6, showing the drag mechanism; Fig. 8 is a sectional elevation on the line 8—8, Fig. 6; Fig. 9 is a section on the line 9—9, Fig. 6; and Fig. 10 is a view corresponding to Fig. 9 and illustrating separation of the brake actuating parts when the reel is disassembled.

The reel shown in the drawings comprises the usual frame including end plates 1, 2 connected by pillars 3 and having a foot plate 4 for attachment of the reel to the fishing rod. Between the end plates is located the rotatable spool 5 mounted on a shaft or spindle 6 between bearings marked generally 7, 8, the first of which is adjustable and is located in the end plate 2 and the latter of which is fixed in a cap or cover 9 which cooperates with the end plate 1 as an enclosure or casing for the operating gearing. The latter comprises a gear 10 on the stub shaft 11, the hub of said gear having the driving crank 12 connected thereto. Said gear meshes with and drives a small pinion 13 on the spool shaft and a larger pinion 14 adapted for driving connection with the noncircular portion 15 of a reversely threaded level winding shaft 16. Said shaft is enclosed within a slotted sleeve or casing 17 for shaft protection and to also form a guide along which slides the level winding carriage 18, a removable dog 19 upon which engage the threads of the shaft to cause the carriage to be traversed back and forth as is usual. In the specific form shown the level winding carriage is provided at its opposite sides with projections 20 (Fig. 1), which are adapted to approach but not enter recesses 21 in the end plates 1 and 2. These recesses furnish clearance beyond the range or limit of movement of the line guide so that the line cannot be pinched between it and the end plates. Preferably also for convenience in disassembly the end plate 1 is provided with one or more small notches or recesses 22, Fig. 1, extending beneath the flange of the cap or cover 9 and into which opening a small prying tool may be inserted for prying off the cap from its seat on the usual end plate flange or shoulder 9ª.

The level wind shaft 16 is readily removable from the reel without disturbing the end plates or disassembling the main operating parts of the reel. For this purpose said shaft at one end has a reduced portion, a part 15 of which is squared for driving connection with the gear 14 and the cylindrical portion 15ª of which is journalled in a flanged sleeve 15ᵇ fast with the end plate 1. The other end of the shaft has a similar reduced extension 23 journalled in a sleeve 24, which sleeve and the end of the tube 17 lie within an internally threaded member 25 permanently attached to the end plate 2 and through the opening in which said tube and shaft may be removed endwise. Threaded to the member 25 is a cap 26 within which is a headed plunger 27 having slight longitudinal motion relative to said cap and permanently attached thereto by its upset end head 28. A compression spring 29 urges the head 30 of said plunger inwardly against the end of the sleeve 24. This yielding pressure takes up any endwise motion of the shaft and sleeves and may be increased as may be necessary in case of wear or accrued lost motion due to any cause but, more important, produces a yielding friction effect upon the threaded cap and locks or holds it in any position to which it may be adjusted and thereby prevents loss. The arrangement enables the threaded shaft and sleeves to be readily removed and replaced for any purpose.

The reel is also provided with click mechanism preferably located at that end of the spool opposite to its driving end. As illustrated the spol shaft is provided with the usual click pinion 31, the teeth of which are adapted to cooperate with a yielding pawl 32 of the arrow head type, said pawl being pivotally mounted upon a stud 33 passing through a slot 34 in the end plate and capable of radial adjustment along said slot by manipulation of the operating button 35. This button is mounted or secured upon stud 33 by beading a portion of the metal of said button into an annular groove 33ª in said stud. The sides of the pawl engage the free ends of an annular spring 36, which, opposite the pawl, has a plate portion 37 seated in a recess of a flange 38 of the end head and is riveted permanently to said head. This arrangement of the plate and flange provides a spring which is simple to manufacture and is solidly and readily attached to the end plate. In the outer position of the pawl shown in Fig. 5 it is inoperative and no clicking effect is produced, but by pushing it in toward the spool axis the ends of the spring pass into recesses 39 of the pawl which then engages the pinion teeth. Rotation of the spool in either direction therefore produces a clicking noise and the pawl serves to also retard spool rotation equally in opposite directions of rotation.

Figs. 6 to 10 inclusive illustrate more particularly the anti-back lash or braking mechanism which is adjustable to varying amounts with positive indications sensible to both sight and touch of its condition, and the parts of which are so arranged as to automatically relieve any braking effect as the reel is disassembled, by separation of the brake operating parts, but without any danger of loss thereof. The drag or braking member may be of any suitable form or material, but is shown as a fiber block or shoe 40 which is slidable radially in a recess formed by guiding ribs 41 on the inner or spool face of the end plate 1. Said shoe cooperates with the friction surface, either internal or external, of a suitable member rotatable with the spool and as shown cooperates with the external surface of a relatively small drum 42 on the spool shaft and located between end plate 1 and the spool head. Said shoe is actuated by a yielding or resilient member which produces a yielding effect both when holding the shoe in contact with the drum and also in the off or ineffective position of said shoe. In the specific form shown the operating member is a resilient arm 43 formed of spring wire with one end bent around the shank and held by the head of a screw 44 attached to the end plate. Said arm extends loosely through a hole 45 in the brake shoe, its opposite end entering a small opening 46 in an arm 47 of a bell crank lever or member pivoted on a stud 48 carried by a small bracket 49 lying in the cavity 50. Said bracket is provided with a base plate portion 49ª which is riveted or otherwise suitably secured to the reel end head 1, as clearly shown in Fig. 7. To facilitate the application and securement of this bracket to said reel end head, and to also maintain the bracket in proper position upon said end head the bracket base plate portion 49ª is provided at one or both of its ends with a recess 49ᵇ, Fig. 6, two being here shown, said recesses being adapted to receive or engage studs 49ᶜ, Figs. 6 and 7, said studs being preferably formed integral with the reel end head 1. As shown in Fig. 9 the arm 47 of said lever extends through an opening 51 in the end plate and has motion transversely to the length of the resilient arm 43, so that oscillation of the bell crank lever moves the brake shoe radially to the spool axis. The other arm 52 of the bell crank lever has a rounded portion lying opposite the end cam face 53 of a cam member 54 carried by a stud 55 passing through an opening in the wall of cap 9 and provided on its outer end with a head 56 permanently secured thereto, and by means of which the cam may be rotated. Beneath the head 56 is a resilient washer 57 to frictionally hold the cam in the position to which it is rotated or adjusted and to also take up lost motion. Preferably also visible indicating means is provided for the brake, the arrangement shown including an arrow 58 on the head 56 adapted to cooperate with indicia 59 inscribed upon the surface of the cap 9 around the head 56 as shown in Fig. 2.

The cam face 53 is of spiral form and therefore provides an abrupt shoulder 60. In Fig. 9 the arm 52 is upon a high part of the cam and the braking shoe has been moved into braking engagement with the drum 42. By rotating the cam, arm 52 rides down along said cam to a lower position thereon with consequent gradual decrease in the braking effect and finally with some movement of the brake shoe away from actual contact with said drum. The limit of turning motion of the cam is the abutment of the arm 52 with the cam shoulder 60, with the brake shoe in its outermost position. This engagement of the arm and abutment is an indication of brake release position perceptible to the touch and at night gives the reel operator a point from which he may readily depart in adjustment of the brake by touch to a braking position or to ascertain when the brake is off.

The resilient arm 43 is preferably so formed and attached to the reel that in its neutral condition with said arm under no strain or tension the brake shoe lies inwardly from its outermost position and without pressure upon the drum. In other words, it is a mid position. Therefore, by rotating the cam in one direction yielding pressure is applied through said arm 43 to the brake shoe to produce a braking effect and by rotating the cam in the opposite direction the brake shoe is held in its outermost position by yielding effect. Said arm also passes through a hole in the brake shoe and consequently serves both to actuate said shoe and to confine it to its seat between the guiding ribs 41.

In disassembling the reel, when the cap 9 is removed from end plate 1 said cap carries with it only the operating cam 54 and its head or button 56. This motion is directly away from the arm 52 of bell crank lever, as shown in Fig. 10, so that the parts of the drag operating mechanism are separated from each other and the resilient arm 43 automatically moves the brake shoe and bell crank lever to off or release position. The brake is therefore automatically relieved when the reel is disassembled. When the parts are again assembled the operating parts of the brake are restored to their original operative condition.

Figs. 1 and 2 also indicate an improved oiling device for the operating gearing. The wall of the cap or cover 9, in the region of the operating gears, is provided with an elongated opening or slot 61 adjacent to which is a small oil hole 62. Slidable in the slot 61 is the shank 63 of a closure member having a relatively large head 64 on the outside of the cap 9 and headed over on its inside as at 65 for securement purposes. A spring washer 66 holds the closure frictionally in any position to which it may be adjusted. In the position shown in Fig. 2 the flanged head 64 covers the oiling opening 62. By sliding the closure to the opposite end of the slot the oiling opening is exposed for lubrication for the oiling gears. This arrangement enables the gears to be readily lubricated and the sliding motion of the flanged head over the face of the cap 9 cleans the oil hole and avoids collection of dirt or foreign matter.

The braking member is shown as being of substantially the diameter of the hub of the spool. When this member is engaged by the brake shoe the braking action is extremely sensitive and smooth by reason of the fact that the line when wound upon the hub is pulling against the brake by increased leverage. Where the braking effect is exerted at a point greater in diameter than the diameter of the hub, a grabbing action results which tends to interfere with the smooth operation of the reel and is apt to cause a snapping of the line due to the sudden braking effect.

What I claim is:

1. A fishing reel, comprising a frame, a spool rotatable therein, a braking unit including a radially movable braking member effective upon said spool, and an operating unit for said braking unit, said units being separated but individually remaining intact when the reel is disassembled.

2. A fishing reel, comprising a frame structure including two separable members having a cavity therebetween, a rotatable spool, a braking unit including a radially movable braking member effective upon said spool and an actuator therefor, spool operating mechanism in said cavity, and an operating unit for the actuator of said braking unit, said units being separately associated with said frame members and individually remaining intact therewith when said members are separated.

3. A fishing reel, comprising a frame structure including inner and outer plates, a rotatable spool, a spool braking means mounted upon the inner plate between it and the spool, and an actuating device for said braking means mounted on the outer plate and remaining intact with said plate from the inner plate and said spool braking means when said plates are separated.

4. A fishing reel, comprising a frame structure including inner and outer plates separated to provide a cavity therebetween, a rotatable headed spool, operating mechanism for said spool in said cavity, spool braking means mounted upon the inner surface of the inner plate and lying between said surface and a spool head, an operating unit for said braking means mounted upon said inner plate and extending from said braking means into said cavity, and an actuating device for said operating unit mounted on the outer plate, said plates being separable to provide access to said cavity and to also separate said operating unit from its actuating device.

5. A fishing reel, comprising a frame structure including inner and outer plates separated to provide a cavity therebetween, a rotatable spool, operating mechanism for said spool in said cavity, a spool braking member slidable radially on the inner face of the inner plate, a bell crank lever mounted on the inner plate and having an arm extending through an opening therein for actuating said braking member, and means carried by the outer plate and operable from the exterior thereof for actuating said bell crank lever.

6. A fishing reel, comprising a frame structure including inner and outer plates separated to provide a cavity therebetween, a rotatable spool, operating mechanism for said spool in said cavity, a spool braking member slidable radially on the inner face of the inner plate, a bell crank lever mounted on the inner plate and having an arm extending through an opening therein for actuating said braking member, and means carried by the outer plate and operable from the exterior thereof for actuating said bell crank lever, said two plates being separable and the parts being so arranged that when said two plates are in assembled relation said actuating means is effective upon said bell crank lever and when said plates are disassembled said actuating means is separated from said lever and said braking member is released.

7. A fishing reel, comprising a frame, a spool rotatable therein, a braking member effective upon said spool, guiding means for said braking member, and a resilient bar effective upon said braking member for confining it in place in said guiding means and having a normal tendency to move said member to brake release position, and means for actuating said bar to cause the same to move said braking member to applying position.

8. A fishing reel, comprising a frame structure having end plates, a rotatable spool, a braking member effective upon said spool, guides for said braking member, a resilient bar having one of its end portions secured to said frame structure and having its intermediate portion adapted to carry said braking member, said braking member being thereby confined in said guides, said braking member and said bar being located between one of said frame end plates and the spool, and means for actuating the other end portion of said bar to effect movement of said braking member.

9. A fishing reel, comprising a frame, a spool rotatable therein, spool braking means, a bell crank lever mounted on said frame for operating said braking means, and a rotatable end face cam for actuating said bell crank lever.

10. In a fishing reel, spaced end heads, a spool rotatable therebetween, one of said end heads being provided with an opening, a groove supporting pin extending through and movable in said opening, and a button on said pin adapted to be engaged when it is desired to move the pin, said button having a portion beaded into the groove of said pin for securing said button on said pin.

11. A fishing reel, comprising end heads, a spool rotatable therebetween, brake mechanism for said spool including a brake actuating lever, and a supporting bracket for said lever having a base portion secured to one of said end heads, said end heads being provided with spaced abutments engaging opposed portions of said bracket base portion so as to properly position said bracket and maintain the same in proper assembly with said end heads.

12. A fishing reel, comprising end heads, a spool rotatable therebetween, brake mechanism for said spool including a brake actuating lever, and a supporting bracket for said lever having a base portion secured to one of said end heads, said base portion being provided with opposed recesses and said end heads being provided with projections engaging in said recesses so as to facilitate the application and securement of said supporting bracket to said end heads.

13. A fishing reel, comprising end heads, a spool rotatable therebetween, brake mechanism for said spool including a brake actuating lever, and a supporting bracket for said lever having a base portion secured to one of said end heads, said base portion being provided with a recess, and said end head being provided with a projection engaging in said recess so as to properly position and maintain said bracket in proper position upon said end head.

14. A fishing reel, comprising a frame, a spool rotatable therein, a braking member effective upon said spool and movable radially thereto, guiding means for said braking member, a resilient bar carrying said braking member and confining it in place in said guiding means, said resilient bar having a normal tendency to move said braking member to brake release position, and oscillatable means swinging in a plane parallel with the spool axis for actuating said bar to move the braking member to brake applying position.

15. A fishing reel, comprising a frame, a spool rotatable therein, spool braking means, a lever for operating said braking means mounted on said frame to swing in a plane parallel with the spool axis, and cam means for actuating said lever.

16. A fishing reel, comprising a frame, a spool rotatable therein, spool braking means, a lever for operating said braking means mounted on said frame to swing in a plane parallel with the spool axis, and cam means rotatable on an axis parallel with the spool axis for actuating said lever.

17. A fishing reel, comprising a frame structure including inner and outer plates separated to provide a cavity therebetween, a rotatable spool, operating mechanism for said spool in said cavity, a spool braking member slidable radially on the inner face of the inner plate, a lever mounted on the inner plate and extending through an opening therein, said lever having an inner arm for actuating said braking member and an outer arm lying in said cavity, and means carried by the outer plate and operable from the exterior thereof for actuating the outer arm of said lever.

In testimony whereof I hereby affix my signature.

FRANCIS M. CASE.

CERTIFICATE OF CORRECTION.

Patent No. 1,690,401.  Granted November 6, 1928, to

FRANCIS M. CASE.

It is hereby certified that error appears in the printed specification of the above numbered patent requiring correction as follows: Page 2, line 42, for the misspelled word "spol" read "spool"; page 4, line 49, claim 7, before the word "applying" insert the word "brake"; and that the said Letters Patent should be read with these corrections therein that the same may conform to the record of the case in the Patent Office.

Signed and sealed this 15th day of January, A. D. 1929.

M. J. Moore,
Acting Commissioner of Patents.

(Seal)

16. A fishing reel, comprising a frame, a spool rotatable therein, spool braking means, a lever for operating said braking means mounted on said frame to swing in a plane parallel with the spool axis, and cam means rotatable on an axis parallel with the spool axis for actuating said lever.

17. A fishing reel, comprising a frame structure including inner and outer plates separated to provide a cavity therebetween, a rotatable spool, operating mechanism for said spool in said cavity, a spool braking member slidable radially on the inner face of the inner plate, a lever mounted on the inner plate and extending through an opening therein, said lever having an inner arm for actuating said braking member and an outer arm lying in said cavity, and means carried by the outer plate and operable from the exterior thereof for actuating the outer arm of said lever.

In testimony whereof I hereby affix my signature.

FRANCIS M. CASE.

CERTIFICATE OF CORRECTION.

Patent No. 1,690,401.            Granted November 6, 1928, to

FRANCIS M. CASE.

It is hereby certified that error appears in the printed specification of the above numbered patent requiring correction as follows: Page 2, line 42, for the misspelled word "spol" read "spool"; page 4, line 49, claim 7, before the word "applying" insert the word "brake"; and that the said Letters Patent should be read with these corrections therein that the same may conform to the record of the case in the Patent Office.

Signed and sealed this 15th day of January, A. D. 1929.

M. J. Moore,
Acting Commissioner of Patents.

(Seal)